United States Patent Office 3,368,161
Patented Feb. 6, 1968

3,368,161
CYCLOTRON RESONANCE MASER AND LASER USING A MULTIPLE-VALLEY SEMICONDUCTOR AND THE INTERVALLEY PHOTON
John C. Hensel, Summit, N.J., assignor to Bell Telephone Laboratories, Incorporated, Murray Hill, N.J., a corporation of New York
Filed Sept. 20, 1966, Ser. No. 580,807
6 Claims. (Cl. 331—94)

ABSTRACT OF THE DISCLOSURE

A cyclotron resonance laser is disclosed which employs a multiple-valley semiconductive material. Typically, uniaxial stress is applied to perturb the cyclotron energy levels in the multiple valleys so that the reabsorption of the stimulated radiation by electrons in the upper laser level is inhibited, apparently by the intervalley phonon. Establishment of a population inversion is thereby facilitated. Far infrared and microwave embodiments are disclosed.

---

This invention relates to apparatus for the stimulated emission of radiation and particularly to cyclotron resonance masers. As used herein, the term "maser" will be used to describe a device which achieves amplification by the stimulated emission of radiation in the region of the spectrum which extends upward from the microwave region of the spectrum through the optical region of the spectrum.

The rapid development of stimulated emission apparatus has predominantly included devices operating in the microwave portion of the electromagnetic spectrum, typically designated microwave masers, and devices operating at wavelengths shorter than $100\mu$, including the visible portion of the spectrum, hereinafter described as optical masers or lasers. Few devices employing stimulated emission have been proposed for the gap in the electromagnetic spectrum between about $1000\mu$ and about $100\mu$.

One recently rpoposed apparatus for operation in that gap involved the phenomenon of cyclotron resonance. The phenomenon of cyclotron motion occurs when free electrons or electrons in the conduction band of a material are subjected to a magnetic field. The magnetic field forces the electrons to travel in circles or helices. The energy of motion of these electrons in a direction perpendicular to the field is now quantized; that is, their motions perpendicular to the field can be altered only in steps of energy. These steps are more accurately called cyclotron energy levels. The energy difference of adjacent levels is proportional to the strength of the magnetic field. Cyclotron resonance occurs when the energy level spacing is made equal to the energy of incident radiation giving rise to stimulated absorption or emission.

The promise of this phenomenon stems from the fact that the wavelength of a stimulated emission depends upon the difference of two energy levels available in the active material. Thus, a magnetic field of appropriate strength could be applied to an appropriate material to provide the energy step needed for stimulated emission in the far infrared portion of the spectrum. Nevertheless, the substantially equal spacing of the energy levels makes reabsorption of the stimulated radiation likely.

In the Patent No. 3,265,977 of P. A. Wolff, issued Aug. 9, 1966, a cyclotron resonance laser is disclosed in which reabsorption of the stimulated radiation is inhibited by a technique involving the optic phonon, a type of crystalline lattice vibration.

At present it appears that such a cyclotron resonance maser could not be pumper by radiation of wavelength shorter than about one micron and thus cannot be pumped by visible light or even by radiation of the shorter near infrared wavelengths.

Nevertheless, many of the flash lamps and junction masers that may be useful as pumping sources for a cyclotron resonance maser provide most of their available power at wavelengths shorter than one micron.

Moreover, the narrow pumping bandwidth required and the low overall theoretical efficiency of such a cyclotron resonance maser detract considerably from its advantage of continuous tunability over a broad range, including the heretofore largely inaccessible wavelength range from 100 to 1000 microns.

An object of my invention is to provide an improved cyclotron resonance maser, especially one that is improved with respect to one or more of the above-mentioned characteristics.

I have discovered cyclotron resonance stimulated emission in a multiple valley semiconductive material, such as silicon, that is subjected to uniaxial strain.

The term "multiple valley" refers to the family of curves that describe the energy-momentum relationships of conduction band electrons in such a material. As is well-known, the family consists of at least three curves each designated a "valley." Each valley has its vertex aligned at a common magnitude of momentum. The curves that describe energy-momentum relationships of charge carriers in the valence band usually do not have vertices at the same value of momentum as any of the above-described families of curves, or valleys, that describe conduction band electrons. Therefore, a multiple-valley semiconductive material is typically an indirect-band-gap material.

Without subscribing to any particular theory with respect to the operation of my invention, I suggest that the facility with which cyclotron resonance stimulated emission is obtained in a maser according to my invention is attributable to the following mechanism. It appears that the probability of transitions that absorb the stimulated radiation is reduced by a collision-scattering mechanism. In this collision-scattering mechanism, the lattice vibration called the intervalley phonon quickly removes electrons from the cyclotron energy level immediately above the upper maser level to an unoccupied donor energy level. It is inherent in this mechanism that the affected electrons must change their momenta so that the transition occurs between different valleys. The application of uniaxial strain facilitates this mechanism because the energy separation and momentum separation of that cyclotron energy level above the upper maser level and that unoccupied donor energy level are thereby adjusted to one of the discrete set of values at which the intervalley phonon can exist. In other words, the uniaxial strain provides an appropriate relative shift of the energy-momentum valleys.

It should be noted that the intervalley phonon is quite different from, and indeed much more adaptable than, the optic phonon that provided the collision-scattering mechanism in the above-cited patent of P. A. Wolff. In particular, one can vary the uniaxial strain in a cyclotron resonance maser according to my invention to select a different collision-scattering level. The shifted scattering level allows one to truncate the so-called Landau ladder of cyclotron energy levels at a different Landau number, and also permits one to shift the upper maser level correspondingly. The shifted scattering level also permits one to vary the spacing of the upper and lower maser levels over a much wider range than heretofore by varying the magnetic field that supplies the cyclotron energy levels.

Pumping with light wavelengths shorter than one micron in the visible portion of the spectrum can be obtained by adjusting the applied strain to select a higher-energy cyclotron energy level as the scattering level and by adjusting the magnetic field to put the upper maser level sufficiently near the scattering level. A photon of the pump energy can be absorbed by an electron making a transition from the valence band to the upper maser level, which is typically the next cyclotron energy level below the scattering level.

The pumping bandwidth is larger, for the general case, than that of the above-cited patent of P. A. Wolff because in the embodiments of my invention it is always substantially equal to the spacing between adjacent cyclotron energy levels, whereas it is that large in the Wolff embodiments only for certain values of the magnetic field.

The overall theoretical efficiency of the cyclotron resonance maser can readily be increased, compatibly with the foregoing improvements, by increasing the magnetic field to make the spacing between the upper and lower maser levels a larger fraction of the energy spacing between the valence band and the upper maser level and simultaneously by increasing the applied strain to maintain the scattering level above the upper maser level.

In all events, the center frequency of the pump energy is chosen to populate selectively the cyclotron energy level that is the upper maser level.

As a consequence of the preceding tentative explanation of my invention, cyclotron resonance masing action should be obtained in a suitable multiple-valley semiconductive material without the application of uniaxial strain, provided the unoccupied donor energy level is otherwise provided with energy and momentum spacings from the desired scattering level that correspond to the discrete values of energy and momentum that the intervalley phonon can have other features and advantages of my invention will become apparent from the following detailed description, taken together with the drawing, in which:

FIG. 1A is a sectional view, as indicated in FIG. 1, of the microwave cavity and maser crystal of the embodiment of FIG. 1;

Figure 1:
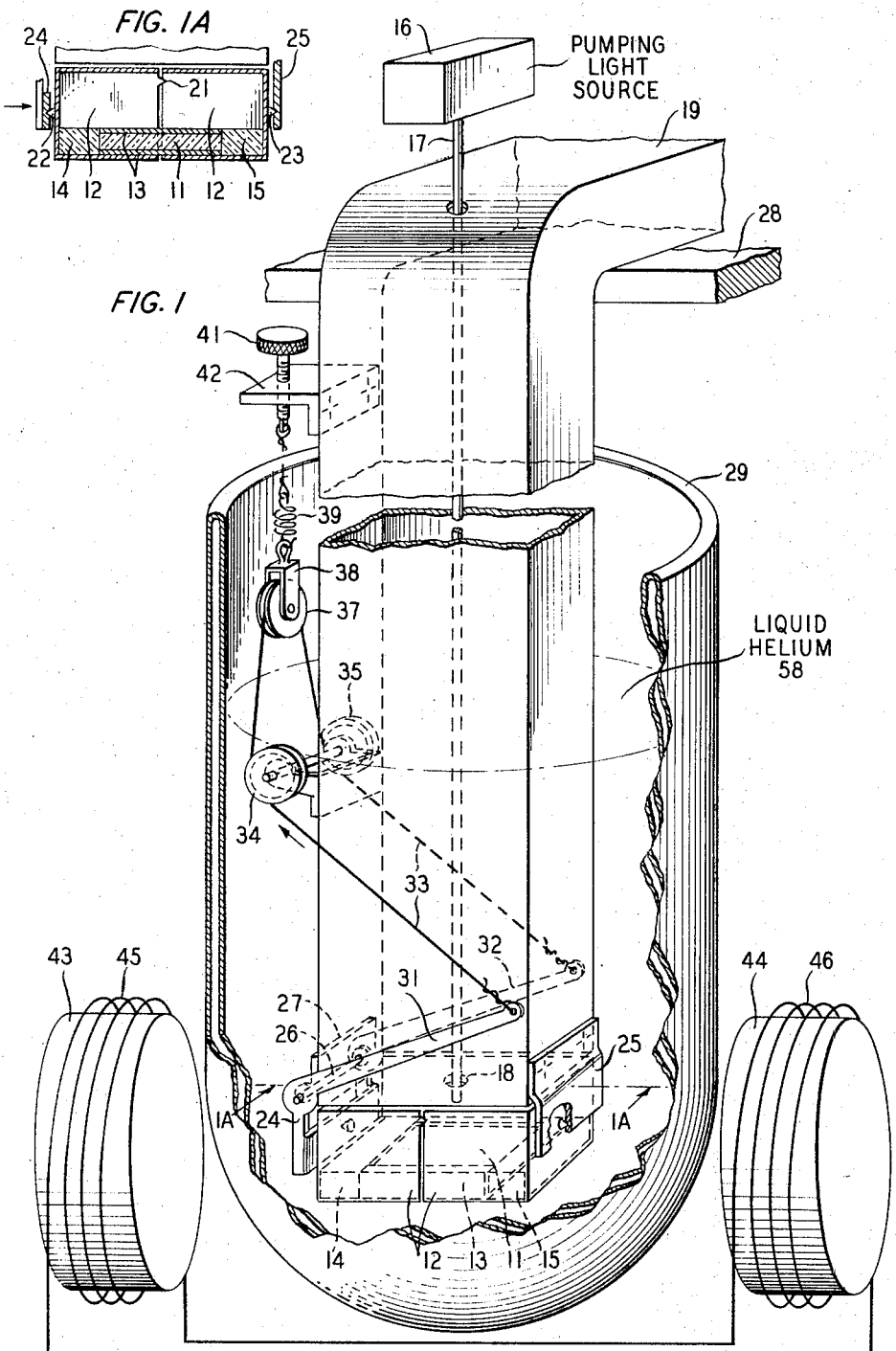
FIG. 1 is a partially pictorial and partially block diagrammatic illustration of a preferred embodiment of the invention adapted for operation in the microwave portion of the spectrum.

In the embodiment of FIG. 1 it is desired to obtain the stimulated emission of microwave radiation, or masing action at a sufficient level of gain from the crystal 11 of a multiple-valley semiconductive material. The crystal 11 is supported in a microwave cavity 12, consisting of two parts, partly by a Teflon spacer 13 which is wrapped around three sides of crystal 11 and has flanges extending to the fourth or upper side and partly by the dielectric spacing blocks 14 and 15. Pumping light is admitted to the microwave cavity from a source 16 via a light pipe 17, which passes through aperture 18 in the end of waveguide 19. The light is projected from the end of light pipe 17 over substantially the entire upper face of crystal 11. The stimulated radiation is emitted coherently from the microwave cavity 12 back through aperture 18 into waveguide 19 and is propagated therethrough to apparatus in which it can be utilized. The two halves of the microwave cavity 12 touch firmly only at the fulcrum 21 displaced laterally from the axis along which stress is applied to crystal 11. The contact at fulcrum 21 need not be a point contact but should provide some degree of freedom of motion of the two halves of the cavity in the vicinity of crystal 11. The cavity 12 is supported in juxtaposition to waveguide 19 by knobs 22 and 23 oppositely disposed on side surfaces of the two cavity halves on a horizontal line approximately through the center of the cavity. This line is parallel to the line of the desired application of stress in crystal 11. The knobs 22 and 23 fit into holes in the movable pressure-applying arm 24 and the fixed pressure-applying arm 25, respectively. The knobs 22 and 23 and pressure applying arms 24 and 25 not only provide a means of supporting the cavity 12 but also a means of applying pressure in the desired direction to the two halves of cavity 12. The applied pressure is then transmitted through the dielectric blocks 14 and 15 to crystal 11.

The movable pressure-applying arm 24 is pivoted on a shaft 26 mounted in a frame 27, which is attached fixedly to a side wall of waveguide 19. Similarly, the upper portion of the fixed pressure applying arm 25 is attached fixedly to the opposite side wall of the waveguide 19. The waveguide 19 is supported on a bench or other suitable mounting 28 so that no part of the apparatus touches the dewar 29. The movable pressure applying arm 24 is pivoted on the shaft 26 by the lever arms 31 and 32; appropriate force is applied to the lever arms 31 and 32 through the springloaded wire 33 which has its ends attached to the arms 31 and 32 respectively and is passed over the guide pulleys 34 and 35, and a loading pulley 37. The guide pulleys 34 and 35 rotate and are supported in a mounting attached to the side of waveguide 19. The frame 38 of pulley 37 is attached through a spring 39 to a force adjusted screw 41 which can be advanced or withdrawn in a mounting plate 42 to change the force applied to loading pulley 37. The mounting plate 42 is fixedly attached to the side of guide 19. Typically, means (not shown) are provided for indicating the level of the force applied to the loading pulley 37. The spring-loading arrangement insures that equal forces will be applied to the lever arms 31 and 32. The magnetic field needed for cyclotron resonance masing action is applied to the crystal 11 from electromagnets 43 and 44 located outside the dewar 29 along an axis passing through the center of crystal 11 parallel to the direction of application of stress. The field coils 45 and 46 of electromagnets 43 and 44 respectively are supplied from a suitable direct-current power source 48. The cross sectional areas of electromagnets 43 and 47 are great enough to provide a uniform electromagnetic field throughout crystal 11. For best operation, crystal 11 is maintained at a temperature near that of liquid helium 50 by emersing the microwave cavity as shown in liquid helium 50 contained in the dewar 29.

The crystal 11 is illustratively a crystal of p-type silicon, which is a suitable mutiple-valley semi-conductive material. An excess of acceptor impurities over donor impurities is provided in crystal 11 even though an appreciable number of donor impurities are included. As the result of excess of acceptors over donors some of the donor atoms will be ionized so that they can accept electrons in their vacant upper energy states. That is, electrons absent from the donor impurity atoms have migrated to some of the excess acceptor impurity atoms. In a typical silicon crystal 11, the concentration of acceptor impurity atoms is approximately $2 \times 10^{12}$/cc.; and the concentration of the donor impurity atoms is approximately $1 \times 10^{12}$/cc.

The dielectric spacing blocks 14 and 15 are typically made of fused quartz. The ends are polished so that force is transmitted to crystal 11 as a uniform uniaxial stress throughout the crystal 11. The wavelength of the pumping light is illustratively approximately 10.600 A. Illustratively, a grating monochromator may be used as pumping light source 16. The light pipe 18 is a solid transparent rod, ilustratively composed of optical grade fused quartz. The strentgh of the magnetic field provided by electromagents 43 and 44 in crystal 11 is illustratively approximately 600 gauss for operation at about 9000 megacycles per second; and the uniaxial stress or pressure applied to crystal 11 through the blocks 14 and 15 and the remainder of the loading numbers is approximately 1000 kg./cm.² The above-specified conditions are typical and can be varied substantially, as will become clear from the folowing explanation of the basic principles of the operation.

Figure 5:
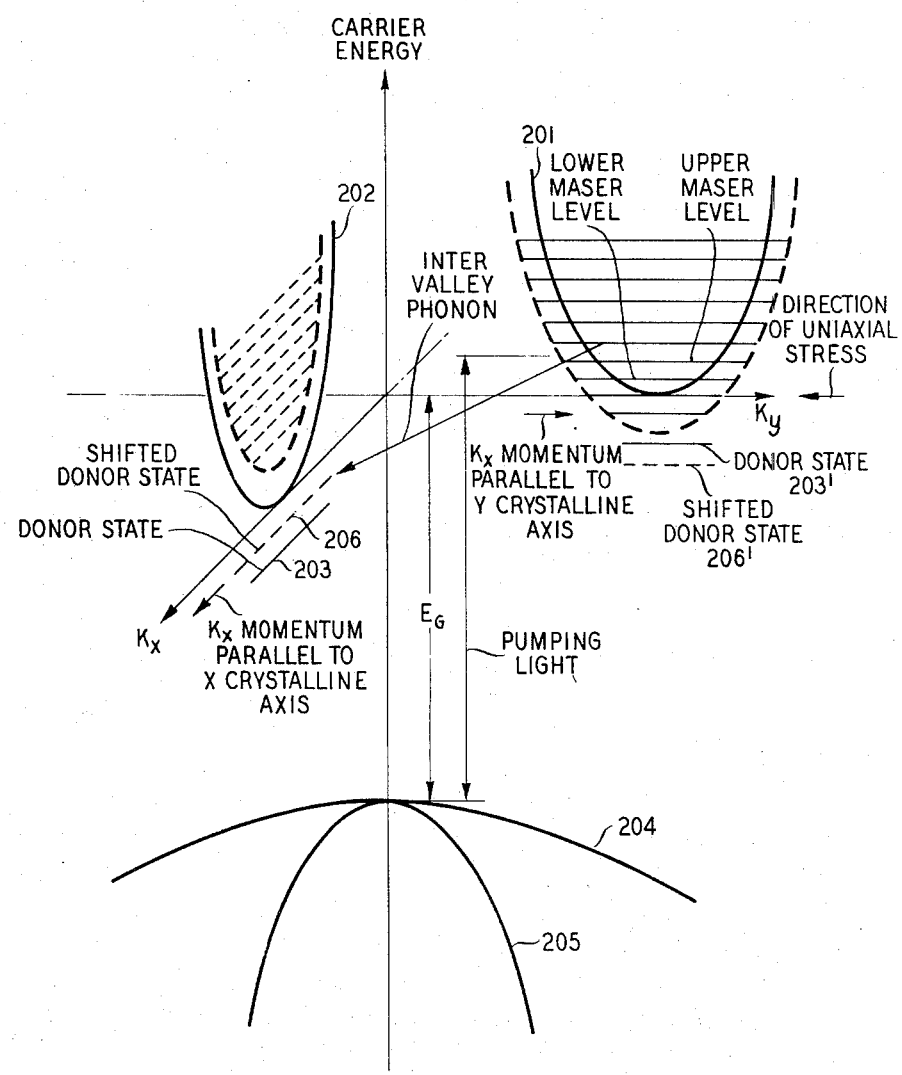
FIG. 5 shows curves that are useful in explaining the theory and operation of the invention.

Reference is now made to FIG. 5 in which are shown representative curves of carrier energy, i.e., electron energy, versus carrier momentum parallel to two of the crystalline axes. It is noted that a complete representation of the energy-momentum relationships of carriers within a crystal of a multiple valley semiconductor material would require a four dimensional representation, i.e., a family of constant-energy spheroid-type surfaces. Each of these closed surfaces would represent the momenta for a specific constant total carrier energy. Nevertheless, the situation can be more simply and understandably represented as shown in FIG. 5, even though only two crystalline directions can be represented. It should be borne in mind that the properties of the crystal are the same for both of the crystalline directions that are orthogonal to the direction of application of uniaxial stress. Thus, in FIG. 5, it is indicated that the uniaxial stress is applied parallel to the $y$ crystalline axis; and the carrier energy-momentum relationships are the same for both the $x$ and $z$ directions, the $z$ direction not being represented except by analogy to the $x$ crystalline direction. The curves of FIG. 5 are essentially sections of dimples in a surface representing energy versus momenta in the two directions. Within the regions shown in FIG. 5, these curves have essentially parabolic shape. The terminology "multiple-valley," when used in describing a semiconductive material, makes reference to these dimples, or curves. Free charge carriers tend to flow into and settle in these energy dimples, or valleys.

The curve 201 and the curve 202 represent the total energy of the electronic carriers in the crystal 11 as a function of momentum parallel to the $y$ crystalline axis and the $x$ crystalline axis, respectively, in the absence of the application of uniaxial stress and the absence of an external magnetic field. The unoccupied donor energy state is represented by line segments 203 and 203' below the vertices of the curves 202 and 201 respectively. It is characteristic that the donor energy state is associated with all of the valleys and not just part of them. The application of uniaxial stress shifts the curve 201 and its associated donor curve state 203' downward and the curve 202 and its associated donor energy state 203 upward, as shown by the respective dotted curves. In other words, those curves associated with momentum parallel to the axis along which stress is applied are shifted downward while those associated with momentum orthogonal to the direction of stress are shifted upward.

The curves 204 and 205 represent valence band energy states, the separate identity of which is not particularly relevant to the present invention.

The application of a magnetic field to the crystal splits the energy states represented by curves 201 and 202 into a multiplicity of cyclotron energy levels which are approximately evenly spaced. Each cyclotron energy level is associated with a different orbital energy associated with the components of motion of the electrons in planes perpendicular to the field. The application of pumping light from the light pipe 18 to crystal 11 moves electrons from the valence band energy states into the conduction band at an energy level which lies somewhere between the indicated upper maser level and the next higher cyclotron energy level.

It may be readily understood that in order to obtain masing action it is necessary to invert the electronic populations of the indicated upper and lower maser states, the latter being the cyclotron energy level next below the upper maser state. As explained in the above-cited patent of P. A. Wolff, it is necessary to provide some means of preventing electrons in the upper maser state from absorbing part of the emitted radiation and thereby moving into the next higher cyclotron energy state. It is my tentative explanation of my invention that in a multiple valley semi-conductor material, this function can be achieved by suitable disposition of the shifted donor energy state with respect to the cyclotron energy level next above the upper maser level. This suitable disposition of the shifted donor state is that disposition which gives the shifted donor state a momentum separation and energy separation from the level next above the upper maser level exactly matching the momentum and energy of the crystalline lattic vibration known as the intervalley phonon.

The intervalley phonon absorbs energy from an electron which is then permitted to move into a shifted donor state associated with one of the valleys representing momenta along the $x$ or $z$ crystalline axes. It is characteristic of the principles of the operation of the present invention that the intervalley phonon can have only discrete momenta and energies, which must match the momenta and energies that available charge carriers can give up in making an energy transition. That is, the transition thereby becomes permitted.

In general, in silicon and in many other multiple valley materials, it is necessary to perturb the energy states in order to make possible such a transition from the state next above the upper maser state. The application of uniaxial stress is the preferred way of perturbing energy states in a controllable fashion. Nevertheless, in some multiple valley materials it may be feasible to provide an unoccupied donor energy state which does not need to be shifted in order to receive an electron via energy release to the intervalley phonon.

For purposes of further explanation of the operation of the embodiment of FIG. 1, assume that the thumb screw 41 has been adjusted to apply a force providing a suitable uniaxial stress in crystalline 11 and thereby providing the desired suitable disposition of shifted donor state 206 with respect to the cyclotron resonance energy level next above the upper maser level. The pumping light selectively populates the upper maser level and provides the desired population inversion between the upper and lower maser level. The cavity 12 provides a resonant frequency corresponding closely to that frequency associated with the energy separated between the upper and lower maser states so that any noise radiation at that frequency is capable of stimulating the emission of coherent radiation. With a suitable level of intensity of the light from the light pipe 18, the gain of the crystal-cavity system is above the oscillation threshold; and a coherent oscillation occurs. Although some of the electrons making the radiative transition to the lower maser state may absorb stimulated radiation to make the reverse transition, the upward transition is less probable than the downward transition because the pumping light maintains a greater population in the upper maser state than in the lower maser state.

The probability of an upward transition from the upper maser state to the next higher level is less probable than the downward transition from the upper maser state to the lower maser state because of the high probability of the downward transition from that next higher level to the shifted donor state via energy release through the intervalley phonon. In this respect, the quantum mechanical explanation is quite similar to that set out in detail in the above-cited patent of P. A. Wolff. The probability of transition to the door energy state is much greater than the probability of any of the transitions between cyclotron. energy states associated with curve 201, in part, because all of the valleys of the crystal share the donor energy state. That is, the transition of the electron can be either to a shifted donor state associated with an x-axis valley or to a similar shifted donor energy state associated with a z-axis valley (not shown). The probability of occurrence of this intervalley phonon, once electrons have ascended to the appropriate cyclotron energy level, is as high, or nearly as high, as the probability of occurrence of the optic phonon in the system described in the above-cited patent of P. A. Wolff.

The microwave oscillation excited in the cavity 12 as a result of the radiative maser transition is transmitted into the waveguide 19 through the aperture 18 and is propagated to the ultimate utilization apparatus (not shown). The microwave radiation thus obtained is a coherent radiation of very low noise level, as is characteristic of other masers. In addition, the microwave radiation is tunable over a plurality of discrete frequency ranges to the extent peermitted by the microwave cavity 12. Such tuning is accomplished by variation of the magnetic field provided by electromagnets 43 and 44.

It should be understood that there are alternative arrangements for applying uniaxial stress to the multiple-valley semiconductive crystal and that there are alternative arrangements for resonating the stimulated radiation. Alternatives for each of these functions are illustrated in the embodiment of FIG. 2.

Figure 2:
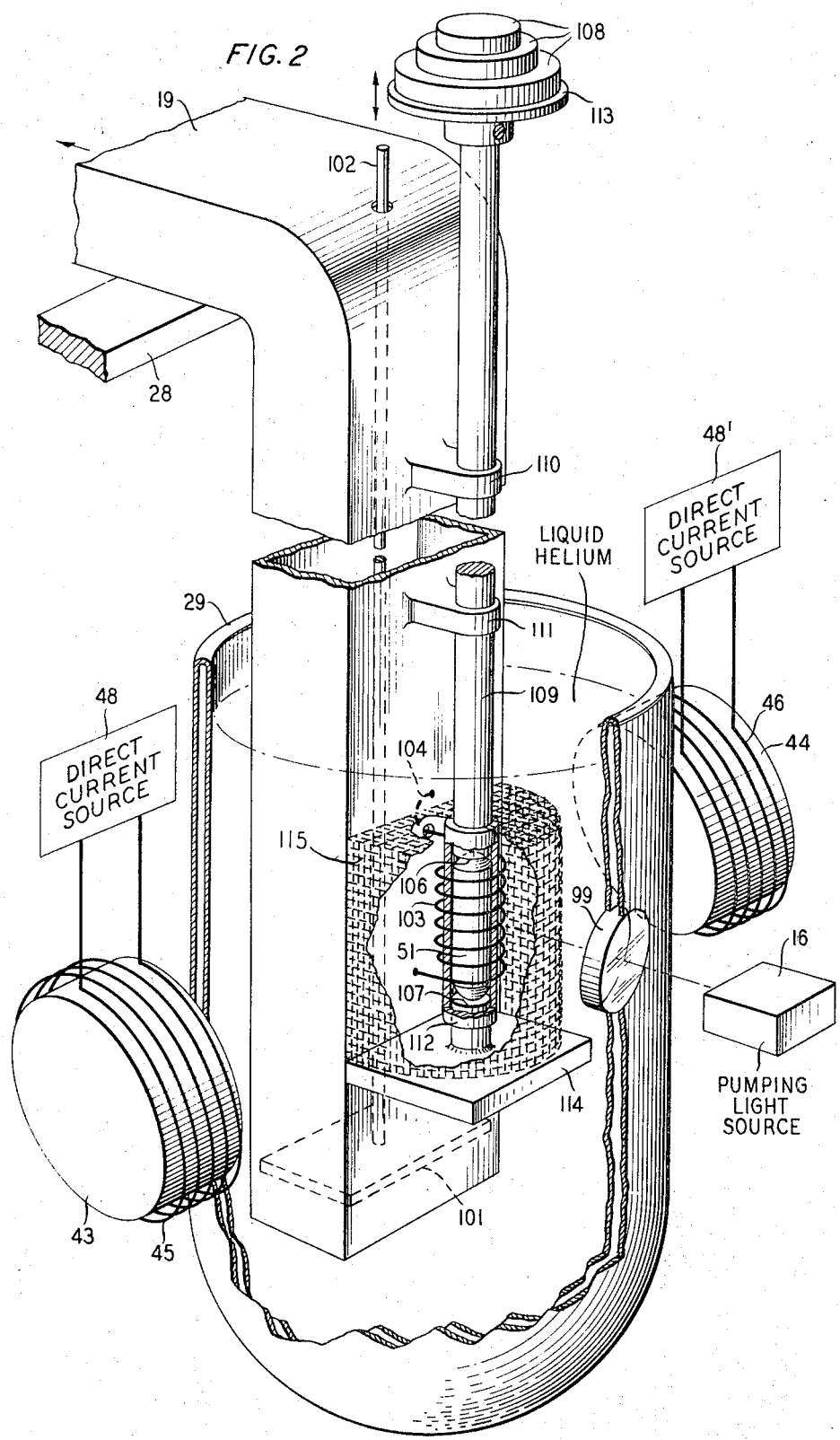
FIG. 2 is a partially pictorial and partially block diagrammatic illustration of an alternative embodiment of the invention for operation in the microwave portion of the spectrum.

In FIG. 2, components like those of FIG. 1 are identified with the same numeral. In this embodiment of the invention, the resonator is formed by a coil 103 which is terminated in a microwave coupling loop 104 within the waveguide 19. The coil 103 is wound about the crystal 51. The coupling of the loop 104 to the guide 119 can be varied by moving the piston 101 within guide 19 by application of a suitable force to connecting rod 102.

A uniaxial stress is applied to the crystal 51 by suitable pressure-applying members 106 and 107 loaded by weights 108 which can be changed to adjust the uniaxial stress. In this embodiment of the invention the crystal 51 has convex hemispherical end caps which fit in matching concave hemispherical surfaces of the pressure-loading members 106 and 107. The pressure-loading member 107 is supported by a mounting plate 114 attached to a side wall of guide 19; and the pressure-loading member 106 rides movably upon the end of a push rod 109 which passes through guides 110 and 111 fixedly mounted to the side of waveguide 19 and also passes through guide 112 attached to fixed loading member 107 or to the plate 114. The crystal 51 is inserted in the guide 112; and guide 112 is surrounded by the coil 103. The guide 112 should be of a suitable dielectric material such as Teflon or quartz. The end loading members 106 and 107 are of dielectric materials such as quartz. The weights 108 rest upon a platform 113. As in the embodiment of FIG. 1, no part of the apparatus touches the dewar; and the dewar is filled with liquid helium.

In order to prevent radiation loss to the surroundings, the microwave resonating coil 103 is shielded on one side by the wall of waveguide 19, on one end by the mounting 114, and on all remaining sides by the copper wire mesh or screen 115. The wires of mesh are sufficiently fine in relation to their spacing that the light from pumping source 116 can readily pass therethrough to the crystal 51. The light from source 16 is admitted through side walls of dewar 29 by means of a window 99 which is provided flat surfaces. In all other respects the embodiment of FIG. 2, is substantially the same as the embodiment of FIG. 1 both in structure and operation. It will be noted that the embodiment of FIG. 2 teaches that the direction of the magnetic field need not be parallel to the direction of stress. In this embodiment, the two directions are mutually orthogonal.

Figure 3:
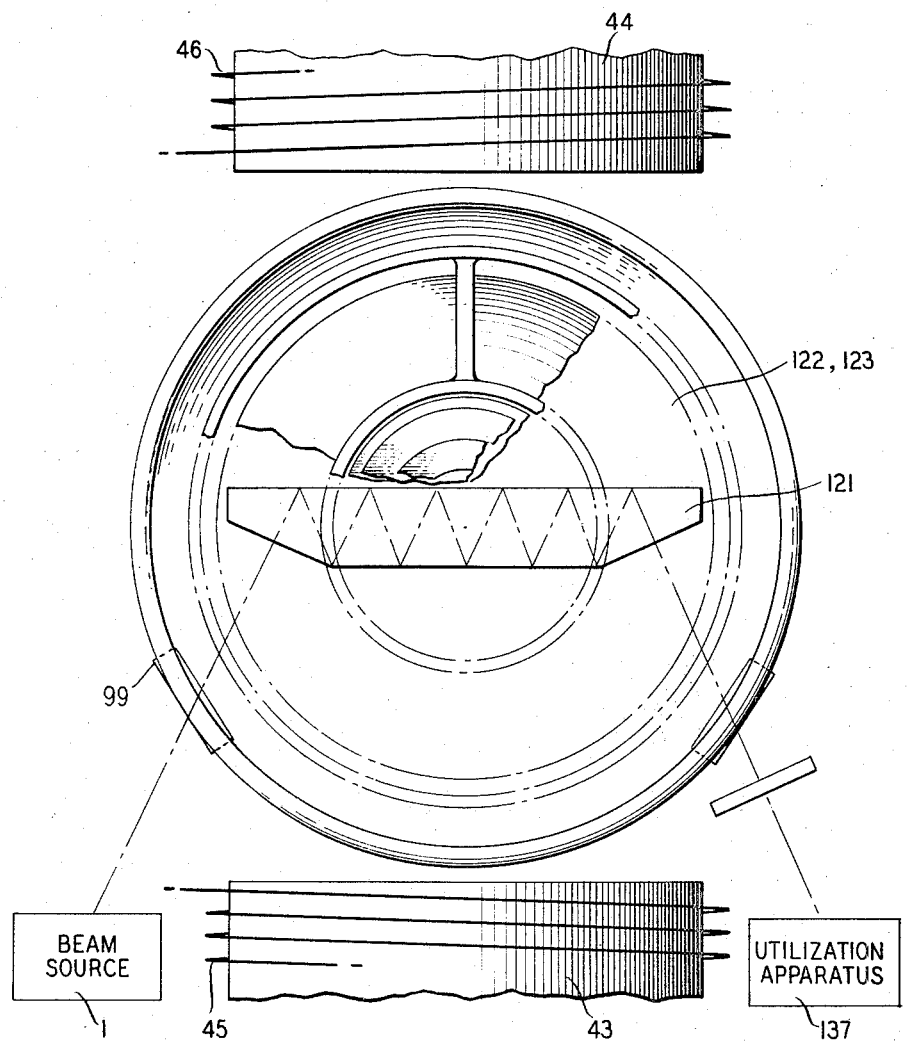
FIG. 3 is a partially pictorial and partial block diagrammatic plan view of a preferred embodiment of the invention for operation in the infrared portion of the optical spectrum.
Figure 4:
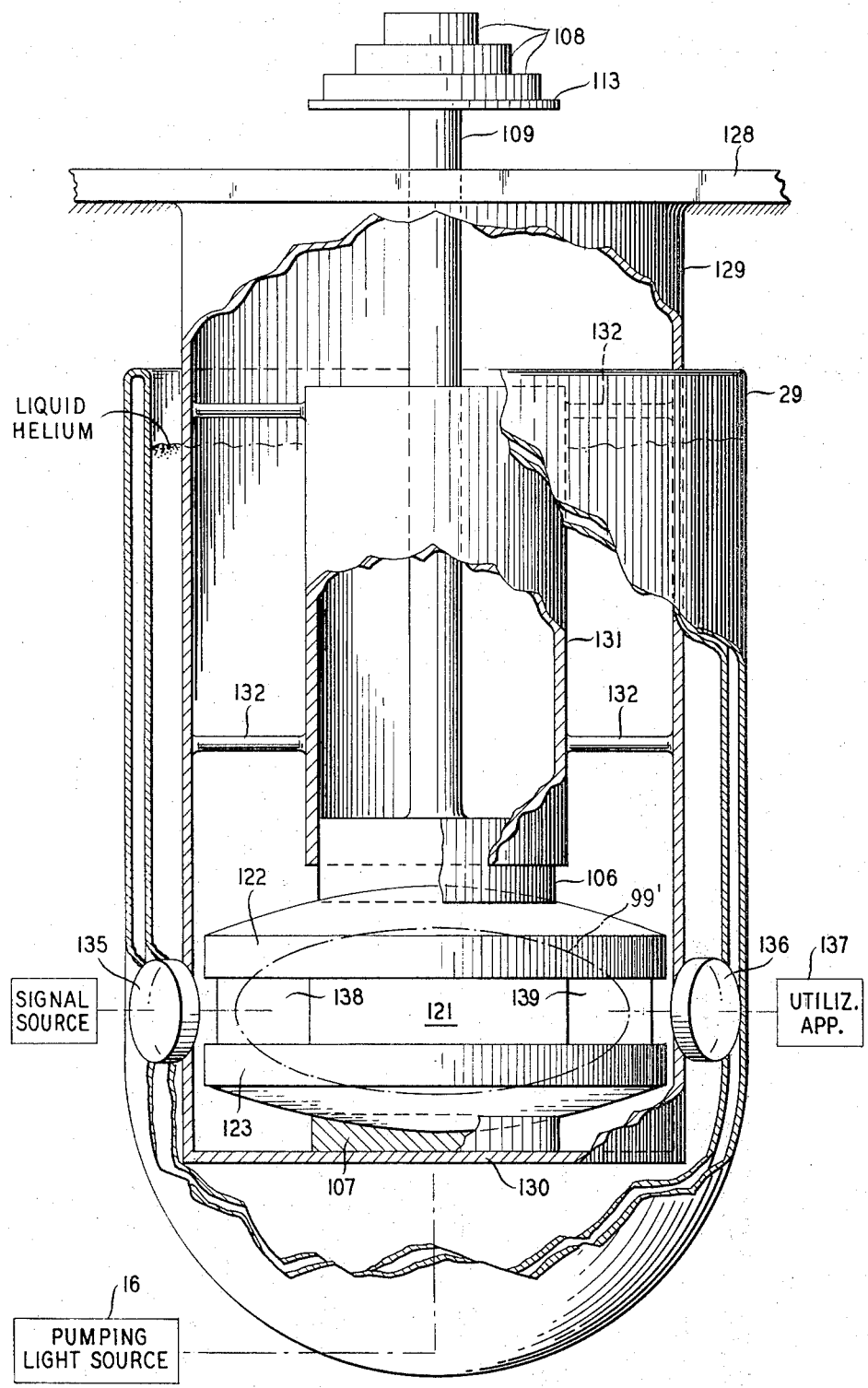
FIG. 4 is a front elevation of the embodiment of FIG. 3.

The present invention is not limited to the generation of coherent microwave radiation. It is also applicable to the generation of coherent optical radiation. An embodiment suitable for the latter purpose is illustrated in the plan view of FIG. 3 and the elevation of FIG. 4. Here again components like those of either FIG. 1 or FIG. 2 are labeled with like numbers in the embodiment of FIGS. 3 and 4. In the embodiment of FIGS. 3 and 4, the crystal 121 of the multiple-valley semiconductive material, i.e., p-type silicon, is shaped in the rhomboidal form disclosed in the above-cited patent of P. A. Wolff. Uniaxial stress is applied thereto by loading members 106 and 107 through rigid hemispherical members 122 and 123, which are illustratively made of sapphire and which are broad enough to contact all of the upper and lower surfaces, respectively, of the crystal 121. The outer limits of theese hemispherical members are shown with a dot-dash line in the plan view of FIG. 3, as indicated.

The entire assembly is supported from a bench plate or mounting 128 so that no part of it touches the dewar 29. That is, a large hollow cylindrical tube 129 is attached to the under side of the mounting 128 and is sealed at its opposite end by an end plate 130 which supports the fixed loading member 107. The movable loading member 106 is guided by an inner hollow cylindrical tube 131 which is mounted by a suitable rigid webbing 132 inside the tube 129. In its upper end, the tube 131 has an aperture suitable to guide the push rod 109, as does also the bench plate 128. The light from pumping source 16 is admitted to crystal 121 through a suitable flat wall window 99 in the side walls of dewar 29. Light from a signal source 134 of frequency matching that of the stimulated radiation is admitted through a similar flat wall window 135 and thence through the surface 138 of crystal 121; and the amplified signal is transmitted from the surface 139 of the crystal 121 to a suitable utilization apparatus 137 through a similar flat window 136 in the side wall of dewar 29.

While this embodiment of the invention is illustrated as an amplifier, it could equally be used as an oscillator by providing a high reflectivity dielectric coating upon the surfacees 138 and 139 of the crystal 127.

The primary difference between the embodiment of FIGS. 3 and 4 in the embodiments of FIGS. 1 and 2 resides in the fact that a relatively larger magnetic field is applied to the crystal 121 to separate the cyclotron energy levels that are the upper and lower maser levels by an amount corresponding to the energy of the desired optical radiation. In this connection, in order to insure that at least two cyclotron energy levels are below the cyclotron energy level coupled to the intervalley phonon, it may be necessary to apply substantially larger amounts of uniaxial stress than in the embodiments of FIGS. 1 and 2. In all other respects, the theory and operation of the embodiment of FIGS. 3 and 4 is similar to the theory and operation of the preceding embodiments.

In all cases, the above-described arrangements are illustrative of the many possible specific embodiments that can represent applications of the principles of the invention. Numerous and varied other arrangements can be devised in accordance with these principles by those skilled in the art without departing from the spirit and scope of the invention.

What is claimed is:

1. Apparatus for the stimulated emission of radiation, comprising a crystal of multiple-valley semiconductive material, means for supplying in said crystal at least two cyclotron energy levels between two of which a population inversion can be established, means for applying a stress to said crystal to perturb said cyclotron energy levels and facilitate the establishment of said population inversion, and means for supplying to said crystal energy that selectively populates one of said two levels to establish said population inversion and enable the stimulated emission of radiation.

2. Apparatus for the stimulated emission of radiation, comprising a crystal of a multiple-valley seemiconductive material, means for supplying in said crystal at least three cyclotron energy levels between the lower two of which a population inversion can be established, means for supplying an unoccupied energy level at a particular energy and a particular momentum with respect to the upper of said three cyclotron energy levels, which particular energy and particular momentum are equal to a possible energy and a possible momentum of an intervalley phonon, and means for supplying to said crystal energy that selectively populates the upper one of said two lower cyclotron energy levels to establish said population inversion and enable the stimulated emission of radiation.

3. Apparatus for the stimulated emission of radiation, comprising a crystal of a p-type multiple-valley semiconductive material, said crystal including a donor impurity having an unoccupied energy level in said p-type material, means for supplying in said crystal at least three cyclotron energy levels between the lower two of which a population inversion can be established, the upper of said three levels having energy and momentum spacings from said unoccupied donor energy level appropriate for the rapid removal of energy from particles in said upper level via a lattice vibration called the intervalley phonon, means for pumping said crystal with energy that selectively populates the upper one of said two lower cyclotron energy levels to establish said population inversion and enable the stimulated emission of radiation, and means for resonating the stimulated radiation.

4. Apparatus according to claim 3 in which the semiconductive material is silicon.

5. Apparatus according to claim 1 in which the material is p-type silicon including some donor impurities and the stress-applying means includes pressure applying members and means for weight-loading one of the pressure-applying members.

6. Apparatus according to claim 2 in which the means for supplying an unoccupied energy level comprises a minority impurity in said crystal and means for applying a stress to said crystal.

References Cited

UNITED STATES PATENTS 3,002,156  9/1961  Boyle _____ 330—4
3,265,977  8/1966  Wolff _____ 330—4.3

ROY LAKE, *Primary Examiner.*

DARWIN R. HOSTETTER, *Assistant Examiner.*